(12) United States Patent
Tagra et al.

(10) Patent No.: US 11,316,807 B2
(45) Date of Patent: Apr. 26, 2022

(54) MICROSERVICE DEPLOYMENT IN MULTI-TENANT ENVIRONMENTS

(71) Applicant: International Business Machines Corporation, Armonk, NY (US)

(72) Inventors: Ankur Tagra, Bangalore (IN); Vijay Ekambaram, Chennai (IN); Smitkumar Narotambhai Marvaniya, Bangalore (IN); Apparsamy Perumal, Bangalore (IN); Shinoj Zacharias, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 16/817,842

(22) Filed: Mar. 13, 2020

(65) Prior Publication Data
US 2021/0288925 A1    Sep. 16, 2021

(51) Int. Cl.
*H04L 51/02* (2022.01)
*G06N 20/00* (2019.01)
(Continued)

(52) U.S. Cl.
CPC .......... *H04L 51/02* (2013.01); *G06F 16/9558* (2019.01); *G06F 40/20* (2020.01);
(Continued)

(58) Field of Classification Search
CPC ...... G06F 16/9558; G06F 40/20; G06F 40/30; G06N 20/00; G06N 7/005; G06N 5/041; G06N 3/0454; H04L 51/02; H04L 51/04
See application file for complete search history.

(56) References Cited

U.S. PATENT DOCUMENTS 9,043,458 B2    5/2015 Balaji et al.
11,068,328 B1 *  7/2021 Rafey ................. G06F 11/3466
(Continued)

FOREIGN PATENT DOCUMENTS

CN    103399942 B    6/2016

OTHER PUBLICATIONS

Nguyen. et.al., Using Microservices for Non-Intrusive Customization of Multi-Tenant SaaS, The 27th ACM Joint European Software Engineering Conference and Symposium on the Foundations of Software Engineering, Aug. 2019, pp. 905-915.
Song et al., Deep customization of multi-tenant SaaS using intrusive microservices, 2018 IEEE/ACM 40th International Conference on Software Engineering: New Ideas and Emerging Technologies Results (ICSE-NIER), pp. 97-100, IEEE, May 2018.
(Continued)

*Primary Examiner* — Thomas J Dailey
(74) *Attorney, Agent, or Firm* — Jorge Maranto; Otterstedt, Wallace & Kammer, LLP

(57) ABSTRACT

A method includes providing a server executing computer code embodying the chat-bot, receiving, via the server, a requirement for customization of a main computer code, the main computer code including modules, and determining, by the chat-bot, top-k modules of the main computer code potentially affected given the requirement for customization. The determination of the top-k modules includes representing each of the modules of the main computer code in an embedding vector space, representing the requirement for customization as a vector in the embedding space, and fetching the top-k modules nearest the requirement for customization in the embedding space. The method further includes determining a question, communicating the question to an entity providing the requirement for customization, receiving a response to the question, and filtering the top-k modules using the response to determine a set of the modules associated with the requirement for customization.

14 Claims, 10 Drawing Sheets

(51) Int. Cl.
    *G06F 16/955*     (2019.01)
    *G06F 40/20*     (2020.01)
    *G06F 40/30*     (2020.01)
    *H04L 51/04*     (2022.01)
    *G06N 3/04*     (2006.01)
    *G06N 5/04*     (2006.01)
    *G06N 7/00*     (2006.01)

(52) U.S. Cl.
    CPC ........... *G06F 40/30* (2020.01); *G06N 3/0454* (2013.01); *G06N 20/00* (2019.01); *H04L 51/04* (2013.01); *G06N 5/041* (2013.01); *G06N 7/005* (2013.01)

(56) References Cited

U.S. PATENT DOCUMENTS

| | | | | |
|---|---|---|---|---|
| 11,196,861 | B2* | 12/2021 | St-Cyr | G06Q 30/01 |
| 2017/0180284 | A1* | 6/2017 | Smullen | H04L 67/306 |
| 2018/0032576 | A1 | 2/2018 | Romero | |
| 2018/0039501 | A1 | 2/2018 | Jain et al. | |
| 2018/0232741 | A1* | 8/2018 | Jadhav | G06Q 30/016 |
| 2019/0012390 | A1* | 1/2019 | Nishant | G06F 16/248 |
| 2019/0026085 | A1* | 1/2019 | Bijani | G06F 8/60 |
| 2019/0156177 | A1* | 5/2019 | Abdallah | G06F 40/30 |
| 2020/0410012 | A1* | 12/2020 | Moon | G06N 3/049 |
| 2021/0232971 | A1* | 7/2021 | Mishra | G06Q 30/0201 |

OTHER PUBLICATIONS

Tsai et al., SaaS multi-tenant application customization, 2013 IEEE Seventh International Symposium on Service-Oriented System Engineering, pp. 1-12, IEEE, Mar. 2013.

Devlin et al., BERT: Pre-training of Deep Bidirectional Transformers for Language Understanding, Proceedings of the 2019 Conference of the North American Chapter of the Association for Computational Linguistics: Human Language Technologies, vol. 1, pp. 4171-4186, Jun. 2019.

Ben-Nun et al., Neural code comprehension: a learnable representation of code semantics, Advances in Neural Information Processing Systems, pp. 3585-3597, Dec. 2018.

Mannor et al., The cross entropy method for fast policy search, Proceedings of the 20th International Conference on Machine Learning (ICML-03), pp. 512-519, Aug. 2004.

Duan et al., Question generation for question answering, Proceedings of the 2017 Conference on Empirical Methods in Natural Language Processing, pp. 866-874, Sep. 2017.

Blei et al., Latent Dirichlet Allocation, Journal of Machine Learning Research 3 (Jan. 2003) pp. 993-1022.

Patinho-Rodriques, Learning Semantic Patterns for Question Generation and Question Answering, May 2017, pp. 1-90.

Susan Li, Topic Modeling and Latent Dirichlet Allocation (LDA) in Python, https://towardsdatascience.com/topic-modeling-and-latent-dirichlet-allocation-in-python-9bf156893c24 May 2018, pp. 1-20.

* cited by examiner

MICROSERVICE DEPLOYMENT IN MULTI-TENANT ENVIRONMENTS

BACKGROUND

The present disclosure relates generally to an efficient multi-tenant environment, and more particularly to deploying microservices within multi-tenant environments using a small (e.g., minimum) set of software modules.

"Tenants" is a term for a group of clients or software applications that share access to system resources through underlying software. Typically, the code base of multi-tenant deployments cannot be edited or customized on a per client requirement basis, since edits and customizations will affect many client deployments. Therefore, multi-tenant environment providers have opted for deep parallel customizations, where client customized code is written separately as intercepting microservices used at runtime.

SUMMARY

According to some embodiments of the present invention, a method includes providing a server executing computer code embodying an artificial intelligence (AI) chat-bot, receiving, via the server, a requirement for customization of a main computer code, the main computer code including modules, and determining, by the chat-bot, top-k modules of the main computer code potentially affected given the requirement for customization. The determination of the top-k modules includes representing each of the modules of the main computer code in an embedding vector space, representing the requirement for customization as a vector in the embedding space, and fetching the top-k modules nearest the requirement for customization in the embedding space. The method further includes determining a question, communicating the question to an entity providing the requirement for customization, receiving a response to the question, and filtering the top-k modules using the response to determine a set of the modules associated with the requirement for customization.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

1) a chat-bot tool configured to query a client for information about a client microservice requirement;

2) a chat-bot tool configured to query a client for information used to resolve ambiguities identified in module documentation of a main computer code embodying a multi-tenant environment;

3) base code documentation improvement via chat conversation logs; and 4) code review/analysis assisting a customizing client to understand attributes of a service provided by the multi-tenant environment, implications of changing various attributes, assumptions made in the main computer code, and the use of an appropriate coding style/practice as followed in the main computer code.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

Figure 1:
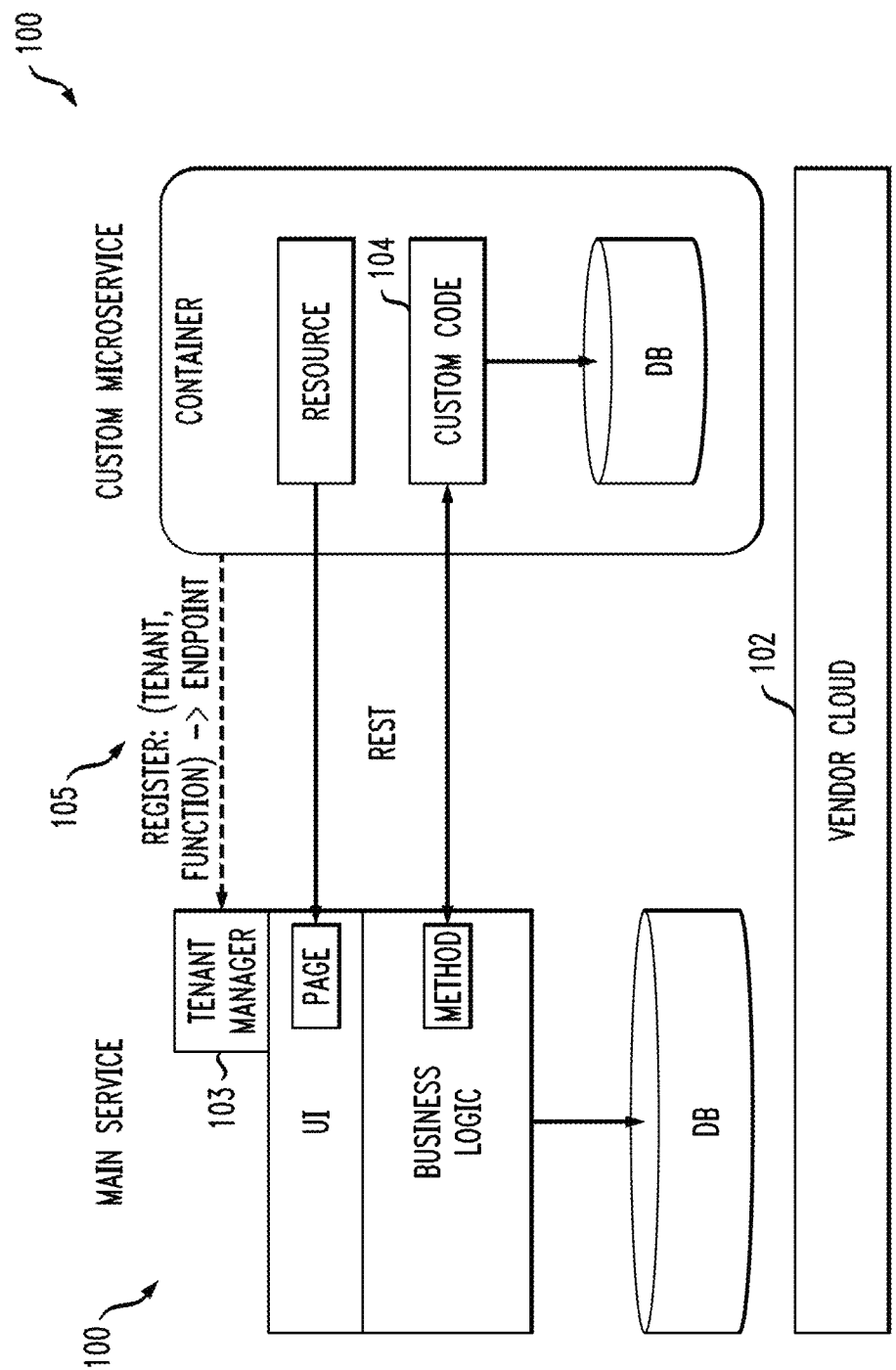
FIG. 1 is a system diagram of a multi-tenant system according to an exemplary embodiment of the present invention.

Embodiments of the present invention are described in the context of a main service code architecture. The main service code is a modular program comprising a plurality of modules, each of which functions to perform a separate sub-program of the main service code. Each module is a separate software component of the main service code. The programming language C is an example of a computer language supporting module programming. Programs written in C are typically structured to solve a large problem using modules called functions or procedures, each of which having a particular functionality. The main program that solves an overall problem is a collection of these functions. Each module can be thought of as a set of interrelated files that share implementation details.

Embodiments of the present invention are related to an artificial intelligence (AI) chat-bot tool configured to analyze a multi-tenant architecture implemented by a main service code and provide an automated system of identifying a small (e.g., minimum) set of modules of the main service code to be modified, augmented, and/or superseded (e.g., by intercepting calls) in deploying a new microservice. The chat-bot tool enables clients to find and understand modules of the main service code. According to some embodiments, the system analyzes a client requirement for the new microservice. According to at least one embodiment, the new microservice is deployed by adding intercepting code (e.g., modules) to the main service code. Herein, intercepting code is configured to replace a functionality provided by the modules of the main service code in the context of a single tenant or client. That is, according to an embodiment of the present invention, a client can provide intercepting code configured to achieve a customization of the main service code (e.g., such that the new microservice functions within the context of the main service) without altering service(s) provided to other tenants or clients by the main service code.

As described herein, the chat-bot tool uses natural language recognition capabilities to discern an intent of a client given some input (e.g., requirements for the new microservice), and respond to the client requirements (e.g., provided as inquiries, requests, etc.) based on the intent of the client.

According to embodiments of the present invention, within a multi-tenant environment, the chat-bot tool determines a structure of main service code, holds new microservices (including those providing client customizations) to a given coding standard (e.g., a standard of the main service code), and determines assumptions made in attributes in microservice affected main service code (e.g., attributes of the modules needed to interact with new intercepting modules providing the new microservice).

Deep code customization (e.g., editing source code for customizations) in a multi-tenant environment is typically not possible since a customization for one client would affect the main service of all clients. One proposed work around to the deep code customization problem is parallel code customizations, where every client manages a different replica of a common codebase, which addresses respective client's requirements independently. Parallel code customizations can be managed by application programming interface (API) calls. Parallel code customizations can be difficult to manage, for example, common code changes, etc., need to be rolled out in all the independent replicas of the codebase.

According to some embodiments, the chat-bot tool, given a client requirement, automatically finds a subset (e.g., a minimal subset) of modules potentially affected by the client requirement, and reports this subset of modules (e.g., to the client user and/or a service provider of the main service). Further, the chat-bot tool outputs to the client users the attributes in each of the modules of the subset. According to some embodiments, documentation associated with the main service is updated to account for the custom microservice code.

According to some embodiments of the present invention, deep customization of multi-tenant Software as a Service (SaaS) is facilitated using intercepting microservices. FIG. 1 shows a main service 100 with a running instance of a standard product provided by a service vendor. The multi-tenancy architecture is an instance of a software application (e.g., logic) serving multiple client users. Each client user is a tenant. A customization a tenant runs as one or more self-contained microservices 101 hosted in a same vendor cloud 102. By way of illustration, containers (e.g., 101) enable efficient multi-tenancy deployments, with multiple applications deployed on a host or vendor cloud. According to at least one embodiment, the main service 100 and the custom code unit 101 communicate with each other via Representational State Transfer (REST) invocations. According to some embodiments, the data exchanged between the main service code and the custom code unit are JSON (JavaScript Object Notation) documents, which are small in size (e.g., on the order of kilobytes (kbs)). Further, the main service does not make any assumption on what the custom code will need and what it will do.

By way of illustration, the main service 100 can be supported by hardware and/or software (e.g., a host—see for example, FIG. 10) executing an application instance (logic) including one or more methods, the logic having access to one or more databases (DB), the logic and DB configured to host the tenants and store/retrieve the data. The main service 100 can include a user interface (UI) accessible to client users. According to some embodiments, a tenant manager 103 is an issuer or administrator of one or more services or applications on a multi-tenant network, and grants access to client users and is able to identity which client user of a group of client users is accessing resources of the tenant of the multi-tenant network.

It should be understood that REST architectures typically treat data and functionality as resources accessed using Uniform Resource Identifiers (URIs). The resources are acted upon by using a set of defined operations. The REST uses a stateless communication protocol, typically HTTP. Further, clients and servers exchange representations of resources by using a standardized interface and protocol.

Figure 2:
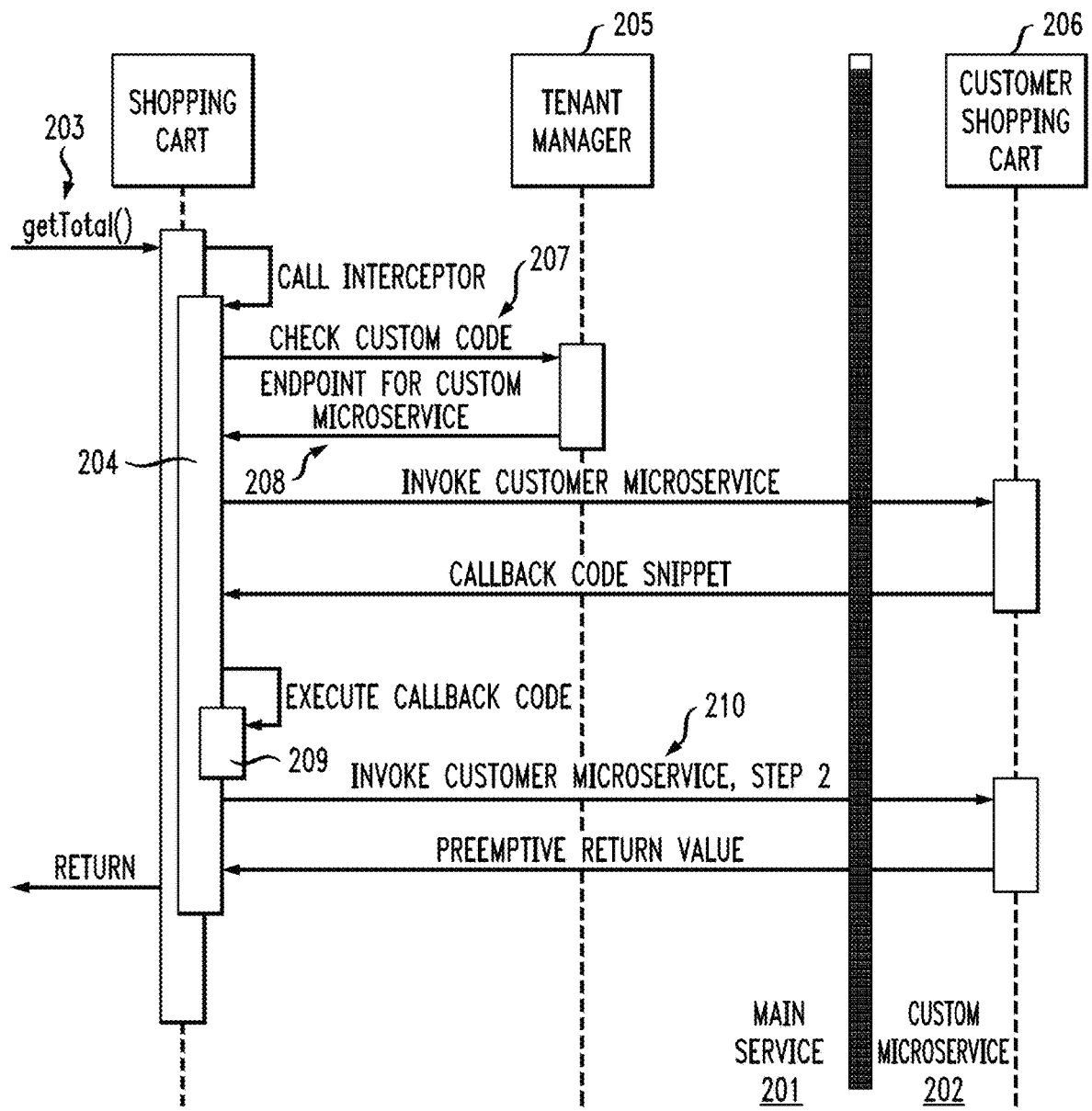
FIG. 2 is flow diagram of a multi-tenant service implementation including a microservice according to an exemplary embodiment of the present invention.

FIG. 2 illustrates an exemplary use case for a client/tenant requiring a charity donation feature customization (i.e., a new microservice) of a main service providing an online shopping platform. In this case, the client wants to introduce the charity donation feature into the online shop embodied by the main service, which comprises existing microservices, including a user management microservice, a catalogue microservice, a shopping cart microservice, and a checkout microservice. According to the client requirement, when an end-user (e.g., a shopper) buys a good, the end-user indicates a desired value of the donation, and the donation is automatically added to a total price (e.g., "getTotal( )") of the shopping cart.

To implement the exemplary use case, the main service 201, including the getTotal( ) function, invokes one or more microservices 202 that add the functionality for the charity donation feature of the new microservice, including a donation function, display donation function, and a total price function (i.e., the total price including the donation).

Referring to the addition of the donation, when the end-user adds an item (e.g., a digital album) to the shopping cart, a new window or page is presented enabling the end-user to indicate the value of the donation, e.g., from 0 to 100% of the item's price. The display of a donation can be facilitated in the shopping cart overview page, where the amount of the donation is shown for each shopping cart item. The total price is calculated for the items in the shopping cart, including the donation.

Referring more particularly to FIG. 2, a method invocation 203 (i.e., "getTotal( )") is intercepted by an interceptor 204. The interceptor 204 consults a TenantManager 205 and receives an endpoint to a Donation ShoppingCart microservice 206 (i.e., the client's customized code enabling the new microservice).

According to at least one embodiment, the communications are initiated and driven by the interceptor 204, which is injected into every method in the main service (product) 201. According to some embodiments, whenever a method is invoked, the interceptor 204 pauses the execution of the main service method body 201, and checks with the tenant manager 205 to determine if the current tenant has registered a custom code unit (see also 104, FIG. 1) registered for this method 207. The tenant manager 205 (see also 103, FIG. 1) returns an endpoint 208 (see also 105, FIG. 1). According to some embodiments, the interceptor 204 then starts the communication with the custom code 206 (see also 104, FIG. 1) by invoking this endpoint with a POST request (post( ) methods are used to request data from a server with an HTTP GET or POST request). The custom microservice 202 (see also 101, FIG. 1) executes the custom code 206 corresponding to the endpoint at 209, and sends back a response 210 based on the execution. Each custom microservice reimplements a small number of structures within the main service source code.

Figure 3:
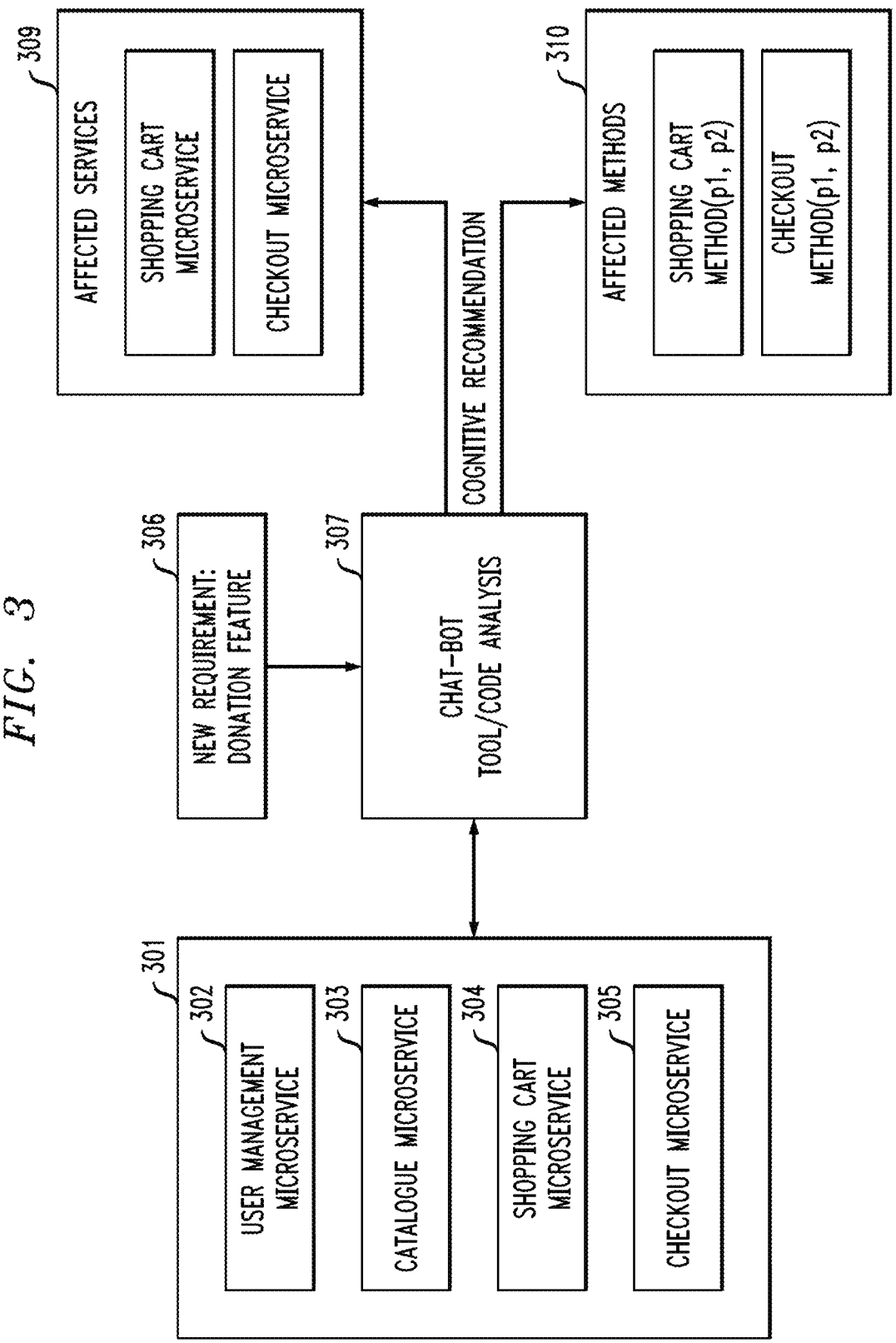
FIG. 3 is a flow diagram of a method of generating modules for a multi-tenant system according to an exemplary embodiment of the present invention.

FIG. 3 illustrates a use case for a chat-bot according to some embodiments of the present invention, configured to assist clients in integrating new/custom microservices into a main service. In this exemplary case, a main service code 301 includes user management module 302, a catalogue module 303 offering goods/services to shoppers, a shopping cart module 304, and a checkout module 305.

According to some embodiments, the chat-bot tool 307 identifies top-k base modules, which can include affected services 309 and/or affected method 310, of the main code 301 based on a client requirement(s) 306. These top-k base modules correspond to routines/scripts/snippets/functions/ etc. that can be modified, augmented, and/or superseded through the use of custom code, which may intercept certain calls (for example, as shown in FIG. 2). According to some embodiments, it should be understood that the identification of the top-k modules can enable other improvements, e.g., through edits to the main code. The client requirement 306 is received by the chat-bot 307 during a query/reply session.

According to at least one embodiment, the chat-bot 307 autogenerates context-dependent queries to the client to elicit details of the client requirement 306 based on one or more requirements of the main code. For example, the chat-bot can request information about the client requirement that can be used to improve code disambiguation for minimal subset (module) suggestion. According to at least one embodiment, the chat-bot tool queries for information that is missing or unclear in the client requirement. According to some embodiments, the chat-bot tool queries for information used to resolve ambiguities identified from module documentations (of the main code). According to some embodiments, the chat-bot tool uses the queries and client replies in determining the subset of the modules of the main code to be modified and/or superseded in the multitenant architecture in order to deploy the new microservice.

For purposes of several embodiments of the present invention, it should be understood that computer source code, e.g., the main service code as described herein, includes comments. Typically, comments are plain text (i.e., human readable) explanations or annotations present in the source code. Commenting is considered a best practice in writing source code. These comments are added with the purpose of making the source code easier for humans to understand, and are typically ignored by computer compilers and computer interpreters.

Figure 4:
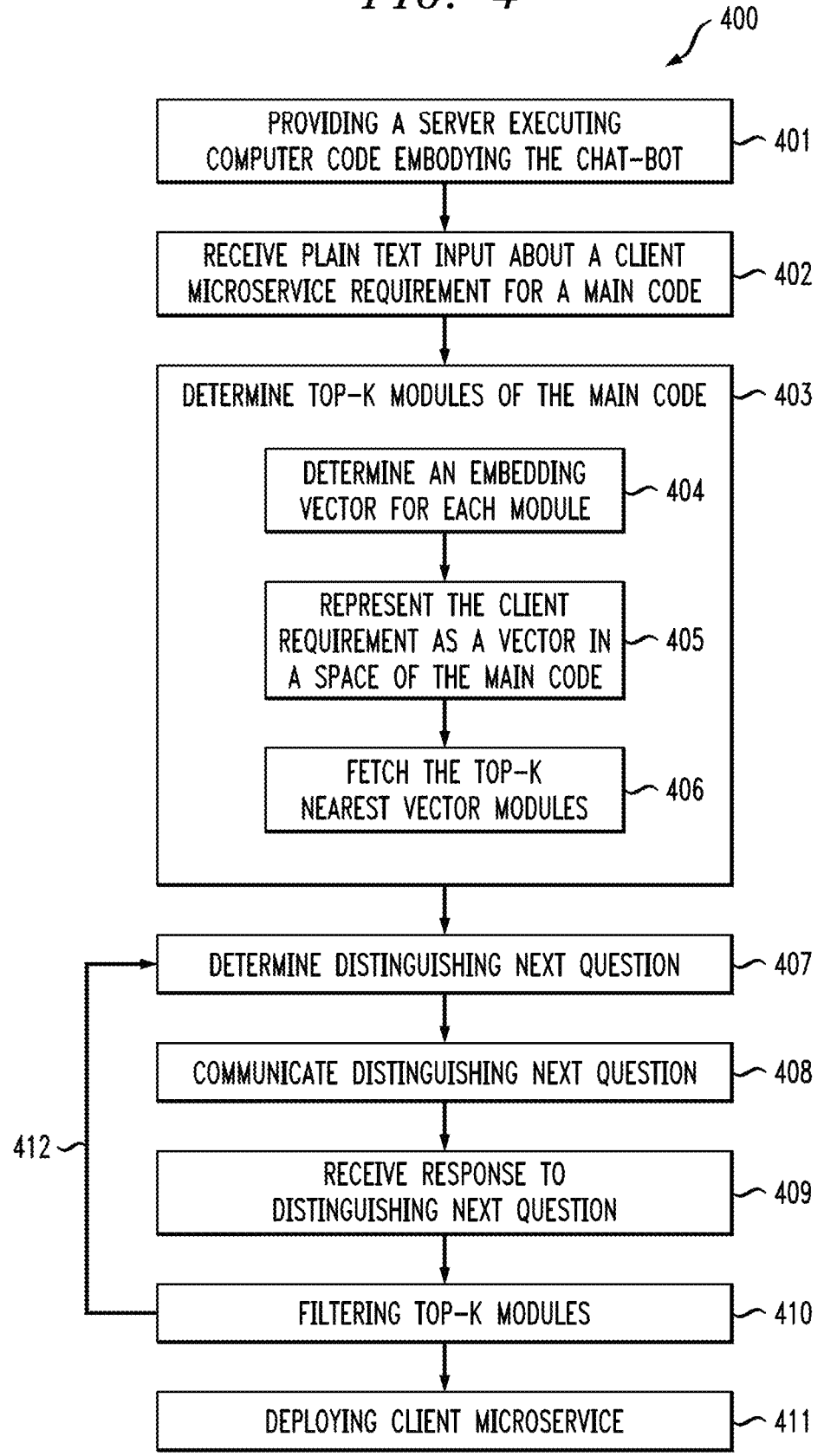
FIG. 4 is a flow diagram of a method of determining a reduced set of modules according to an exemplary embodiment of the present invention.
Figure 5:
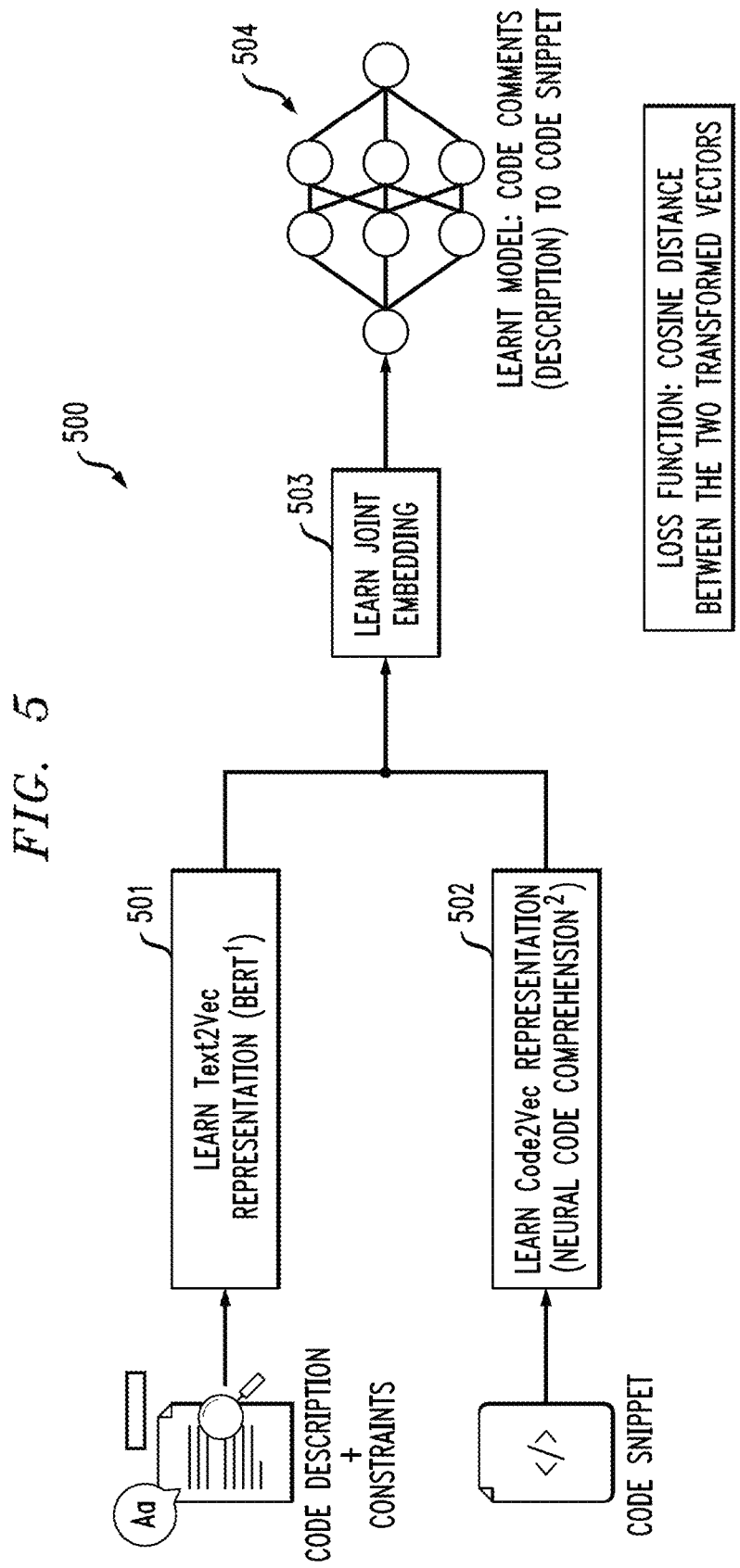
FIG. 5 is a flow diagram of a method of Code2Vec model building for a multi-tenant system according to an exemplary embodiment of the present invention.

Referring to FIG. 4, according to one or more embodiments of the present invention, a method 400 of operating an AI chat-bot includes providing a server executing computer code embodying the chat-bot 401, receiving, via the service, a client entered requirement in plain text 402. The chat-bot determines top-k modules of the main code potentially affected given the requirement 403. The determination of the top-k modules 403 includes representing each of the modules of the main computer code in an embedding vector space 404, representing the requirement for customization as a vector in the embedding space 405, and fetching the top-k modules nearest the requirement for customization in the embedding space 406. The system represents each module as an embedding vector, for example, using Code2Vec, leveraging code naming conventions, documentations, etc. 405 (see also FIG. 5). At block 404, for every code module, the code comments are read and used for creating a code embedding. The system represents the client requirement as a vector in the same embedding space 405 and fetches the top-k nearest vector modules 406. These modules will be suggested in a first pass. The system also applies an entropy analysis across these filtered module texts to determine a distinguishing next question, which could effectively reduce the subset of modules suggested to the client 407. Based on client answer 409 to the proposed question 408, further module filtering is performed 410 happens, and potentially, a next question is generated (applying the same previous step) 407.

At block 410, the method considers a stopping criteria (e.g., whether to perform a further iteration 412 or to output a final list of the filtered top-k modules that would support deployment of the microservice described in the client requirement 411). According to some examples, given N number of requirements from the client, for each requirement, the top-k modules are identified (e.g., as described in connection with Code2Vec methodologies). If k is 1 (i.e., only one module was determined at block 403), then the question generation does not start, however, if k is greater than 1, disambiguation questions are generated at 407.

It should be understood that various methods are known in the art, which can be used to, for example, determine a next question through analysis of chat-logs, determine a plurality of attributes of the main code through analysis of code documentation associated with the main computer code, determine attributes of the main code through analysis of code documentation, etc.

One example is a cross entropy analysis. The cross entropy analysis transforms an original optimization problem into an associated stochastic problem, and solves the associated stochastic problem using an adaptive algorithm. By doing so one constructs a random sequence of solutions which converges probabilistically to an optimal or near-optimal solution. With the associated stochastic problem defined, the cross entropy method generates a sample of random data (trajectories, vectors, etc.) according to a specified random mechanism, and updates the attributes of the random mechanism on the basis of the data, to produce an improved sample in a next iteration.

According to embodiments of the present invention, the cross entropy analysis reduces the number of top-k modules determined in block 403. According to some embodiments, the cross entropy analysis is enabled by constructing various random subsets of the top-k code modules and identifying the minimal ones that represent the vector space of the client requirement(s). This techniques is called cross-entropy analysis for filtering search space.

Figure 6:
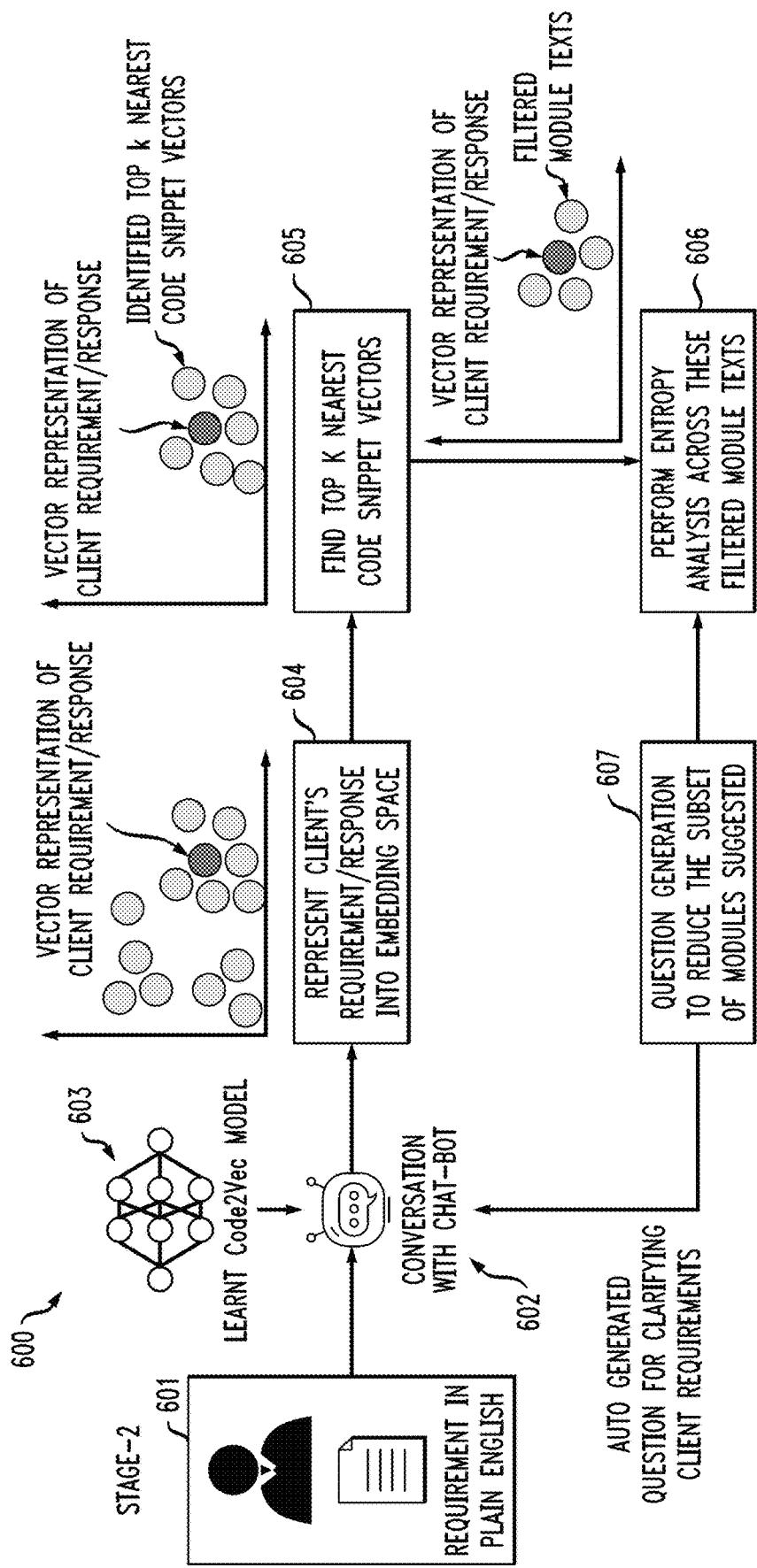
FIG. 6 is a flow diagram of a method of harvesting client requirements for a multi-tenant system according to an exemplary embodiment of the present invention.

According to at least one embodiment, the maximum length of the conversation is equal to a number of gaps discovered (see FIG. 6, block 607). According to some embodiment, the conversation ends in fewer turns, also based on responses.

According to some embodiments, there are N rounds of conversation according to a number of gaps discovered.

According to some embodiments, the chat-bot uses a learned Code2Vec data structure (see model 603, FIG. 6). The Code2Vec framework is a neural model, which represents modules of code as continuous distributed vectors (or code embeddings). Code2Vec represents a code module as a single fixed-length code vector, which can be used to predict semantic properties of the module. Code2Vec decomposes code into a collection of paths in its abstract syntax tree, and learns the atomic representation of each path simultaneously with learning how to aggregate a set of them.

According to embodiments of the present invention, a Code2Vec model building method is implemented, which analyzes the main code along with comments (which can include comments in the code and comments obtain directly from the client) to learn the model 603. The model building method evaluates conditions including the arguments and their ranges of a module being called, a textual representation of the argument variables passed as a module, captured code flow and/or function calls in a hierarchical representation, captured information related to possible outputs/return variables along with their textual representations, captured details of usage of global/local variables that are used in other modules/functions, analyzed test cases along with test case report that are covering the code module, captured history of code modification along with the issue/enhancement details, analyzed usage of variables along with their naming conventions used in the code module, history of the code build failure because of a particular code snippet/module/function, etc. According to at least one embodiment, the system generates the textual description by combining the code comments along with the textual representation of the constraints.

According to embodiments of the present invention, a Code2Vec model building method 500 (see FIG. 5) includes representing the code comments/description and code constraints in a textual representation 501. The method represents the code comments in a vector space, for example, using BERT (Bidirectional Encoder Representations from Transformers) for pre-training deep bidirectional transformers for language understanding 502. According to some embodiments, the method represents the code module in a vector space (e.g., Code2Vec) 503, for example, using Neural Code Comprehension for learning a representation of code semantics. The method includes learning two different transfer functions, which map the code module and code comment vectors into the same space 504.

At block 504 the method further includes learning a first transfer function $f^{code-comment}(x)$ representing the code comment/description into a joint embedding space, and learning a second transfer function $f^{code-module}(x)$ representing the code module into a join embedding space. The method includes using a loss function as a cosine distance between the two transformed vectors $f^{code-comment}(x)$ and $f^{code-module}(x)$. Further, the method includes using positive samples as the correct code module, which linked with code comments, whereas negative samples are automatically generated, which are not linked (code module vs. code comment). According to some embodiments of the present invention, a positive sample is an actual combination (of code module and code comments) found in the codebase, and a negative sample is a random combination of a code module and a code comment.

According to embodiments of the present invention, the system takes the client requirement/response as an input and represents it in a joint embedding space using the learned model and the $f^{code-comment}(x)$ function. The system represents all the code modules in the joint embedding space using the learned model and the $f^{code-module}(x)$. Further, the system finds the top-k embedding vectors of $f^{code-module}(x)$, which are close in the joint embedding space. For example, the top-k code modules are identified based on the closet cosine distance between the vector embedding of the client requirement/response and the code module vectors.

It should be understood that closeness in the joint embedding space refers to a distance between points in the embedding space. For example, a distance can be determined between two data points using cosine distance, Euclidean distance, etc.

FIG. 6 is a flow diagram of a method 600 according to some embodiments of the present invention. The chat-bot receives a client requirement at 601, which initiates a conversion 602. The chat-bot uses a model 603 to represent (e.g., as a vector representation) the client requirement in an embedding space 604. According to one embodiment, in an initial iteration of the method 600, the vector representation of the client requirement is used to determine first set of modules (filtered modules) and generate a question for clarifying the client requirements at 608. Given the clients requirement and a response to the question, which are represented in the embedding space at 604, the method now (e.g., in a second iteration) determines top-k modules of the main code potentially affected given the requirement 605. Each module of code is represented as an embedding vector in the embedding space according to code naming conventions, documentations, etc. The system represents the client requirement as a vector in the same embedding space and fetches the top-k nearest vector modules 605. These modules will be suggested in a first pass. The system also applies an entropy analysis across these filtered module texts 606 to determine a distinguishing next question 607, which could effectively reduce the subset of modules suggested to the client in a next pass (e.g., at 605).

According to some embodiments, the entropy analysis 606 includes identifying a filtered search space by considering a cross entropy analysis across the filtered code comments/module texts. A random sequence of solutions is constructed, which converges probabilistically to an optimal or near-optimal solution based on the cross entropy method. To produce better samples, an associated or counterpart stochastic problem (based on stochastic samples of data, where the number of samples in each stage of the stochastic counterpart is a fixed predefined number) is solved iteratively to identify the best attributes using a stochastic optimization.

Figure 7:
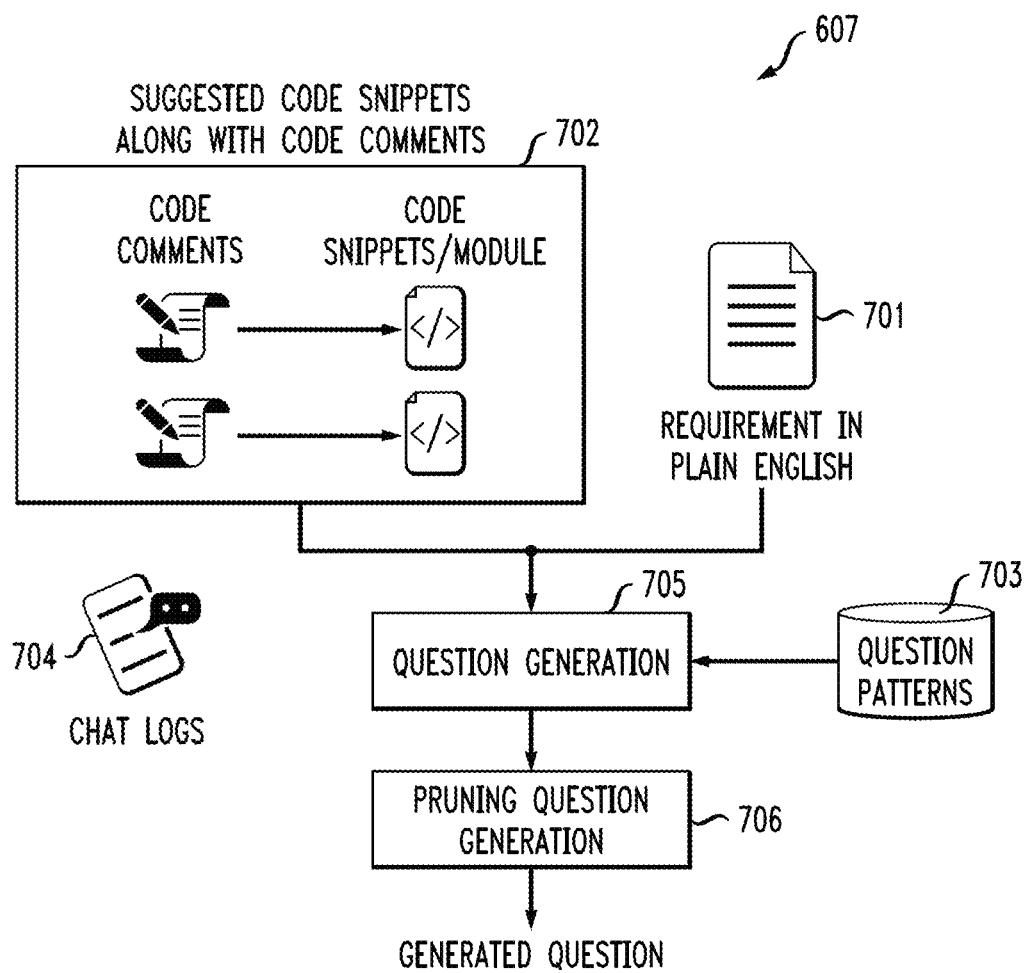
FIG. 7 is a flow diagram of a method for determining a distinguishing next question according to an exemplary embodiment of the present invention.

According to at least one embodiment, to reduce the subset of modules suggested (at 607), the system analyzes the client requirement, chat logs, descriptions of the suggested code modules, and generates one or more possible questions. (See also FIG. 7.)

According to some embodiments, at block 607 the system performs two types of clustering including a first clustering based on code module embeddings (Code2Vec) and a second clustering based on code comments (e.g., using Sent2Vec), and identifies if there is a cluster of the code modules which are farthest with respect to the transferred embedding space and close in the code comment embedding space. The system compares the requirement text with s set of constraints and identifies a potential gap or missing details in the client requirement. Based on the missing text, and keeping the code module as a context, the system generates a set of possible questions, for example, using known question generation methods.

According to at least one embodiment, at block 607 (see FIG. 7) the system analyzes the available data including, for example, the client requirement 701, the output top-k modules 702 (including modules and comments), a database of question patterns 703 (e.g., a knowledgebase of question patterns previously learned and applicable to generating new questions for new unseen client requirements), logs 704, etc., and generates a plurality of possible questions 705. Question generation 705 can be performed by matching text from the client requirement to question patterns in the pattern database 703 (e.g., given a segment S from the client requirement, S's most related question patterns are identified—e.g., by retrieval-based question pattern prediction or generation-based question pattern prediction—and the identified question patterns are used to generate questions). According to some embodiments, a question is generated 705 using the identified question pattern(s) and a topic (for example, extracted by Latent Dirichlet Allocation) of the text from the client requirement, wherein the topic is inserted into the question pattern. According to some embodiments, the system analyzes the log of previous chat conversation to prune the generated questions 706 (e.g., using the previous chat conversation as a knowledge base, from which one or more answers to the generated questions may already be available).

Moreover, in some embodiments, the top-k code modules are determined by an empirical analysis, for example, by a threshold or a certain given number of modules (e.g., a user set X number of modules).

According to some embodiments, base code documentation is improved using a chat-bot conversation log. For example, attributes derived from entropy analysis are leveraged across the code documentation in the context of the client requirement query-reply for automated enriching of code documentation. More particularly, based on the chat-bot queries and client answers (logged) (see also 704) during the code customization (see also FIG. 3), various insight attributes across modules and attributes of the main code are captured. The insight attributes are converted to natural language text and added to code documentation. It should be understood that attributes includes any metadata providing explanatory details about a module. For example, insights such as inputs, outputs, assumptions, business use cases, etc., can be extracted from code comments of a module, and these can function as attributes for a respective module.

According to some embodiments, a system analyzes a log recorded between the client and the chat-bot tool based on one or more constraints. Various information can be gleamed from the log. For example, the system identifies how many questions were asked by the chat-bot to clarify the client requirement for a given code module. In another example, the system captures how many follow up questions were asked by the chat-bot to reach to a conclusion.

According to some embodiments, the system analyzes the type of queries generated by the chat-bot tool. For example, the system can determine how many broad questions were asked to clients, and/or how many narrow questions were asked to clients.

According to at least one embodiment, the system captures features related to the log. For example, using chat transcript analysis, the system determines how many turns in the conversation happened with the client.

According to some embodiments, using chat transcript analysis, the system automatically generates recommendations related to code document improvements via a communication (e.g., email) noting the recommendation's criticality (e.g., the module criticality, the code comment criticality), which can be useful for the client developer. Possible recommendations include, for example, splitting a larger code module into smaller code modules, enhancing descriptions of the test cases/code comments, clarifications on the argument passed to a code module, etc.

Figure 8:
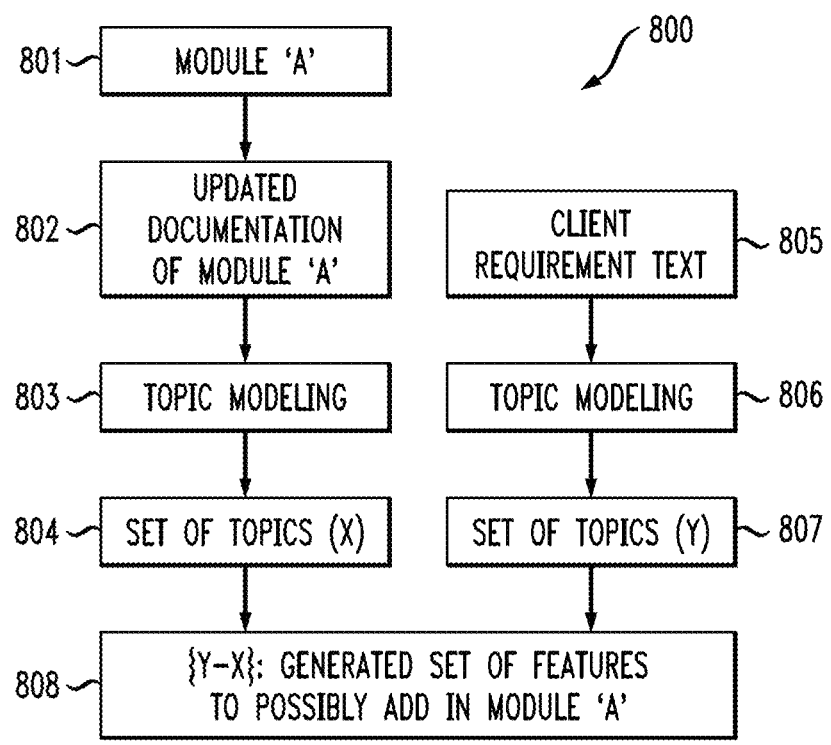
FIG. 8 is a flow diagram of a method for determining new features according to an exemplary embodiment of the present invention.

According to one or more embodiments once the main code documentation is updated based on the chat-log conversation. For example, referring to FIG. 8, a method 800 for determining new features according to an exemplary embodiment of the present invention extracts features from the updated documentation 802 of a given module of the main code 801, and uses topic modelling of the updated documentation 803 to learn a set of topics (X) 804 (for example, extracted using natural language processing such as by a Latent Dirichlet Allocation) that the updated documentation addresses. The method also uses topic modeling 806 of the client requirement 805 to learn a set of topics (Y) 807 described in the client requirement. According to an embodiment of the present invention, the newly learned combination {Y-X} 808 is a computer determined text snippet identifying concepts within the module to be modified in order to deploy the client's new microservice. According to one embodiment, the newly learned combination {Y-X} 808 is structured as input (e.g., as a file, document, etc.) to a software development tool or environment, which can be used to automatically direct the client software developer to the module and to particular code (e.g., objects) within the module that correspond to the client requirement.

Figure 9:
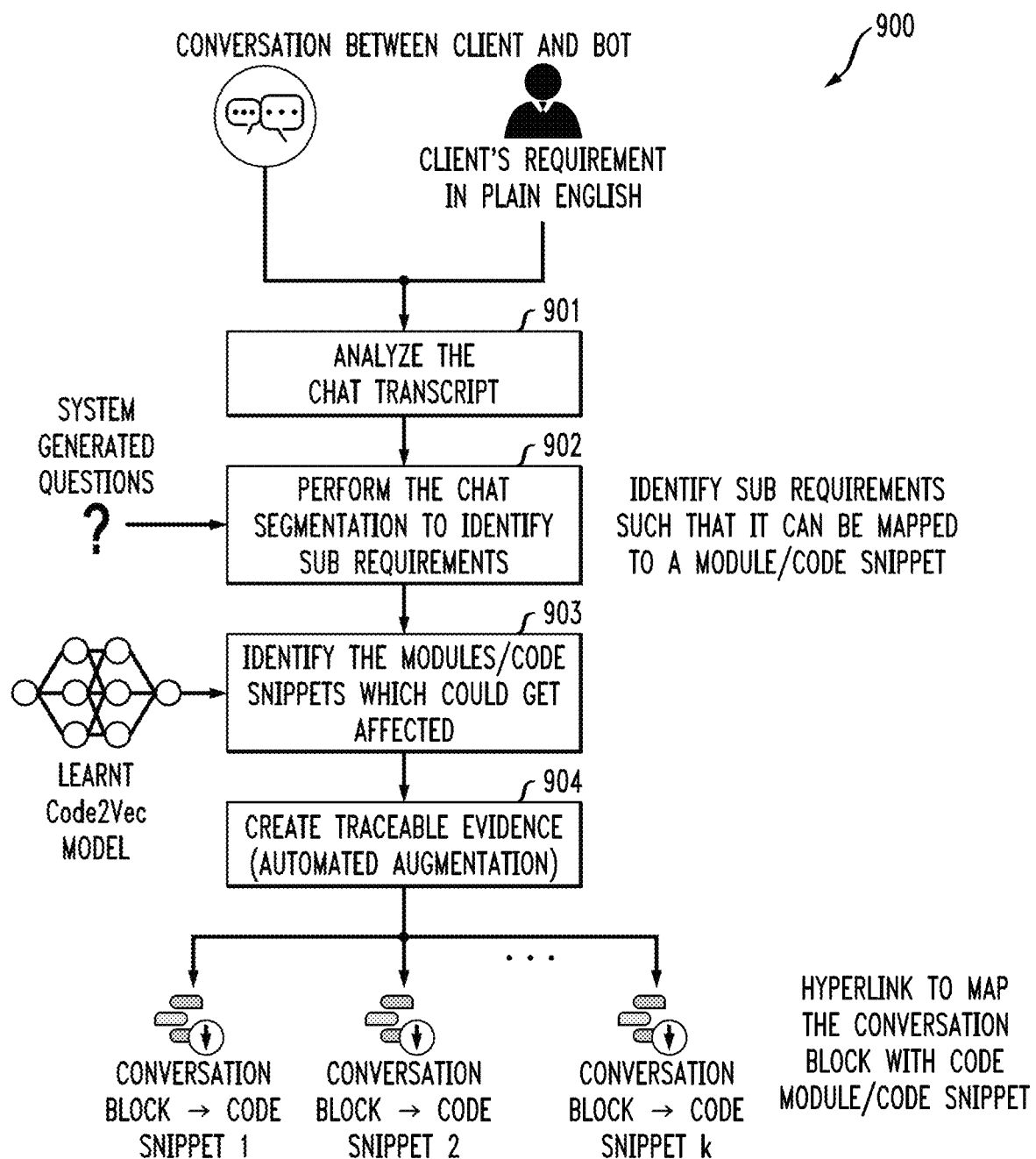
FIG. 9 is a flow diagram of a method for creating traceable evidence for automated augmentation.

FIG. 9 is a flow diagram of a method 900 for creating traceable evidence for automated augmentation. According to some embodiments, the system analyzes the dialog-based conversation between client and the chat bot 901 and identifies one or more conditions. For example, the system identifies the conversation block (e.g., an identifiable portion of the chat-log) which can map to a client's sub-requirement 902. According to at least one embodiment, at block 902 the system analyzes a set of auto-generated questions along with client's responses to draw the boundaries between conversation snippet. The analysis 902 can be achieved by, for example, analyzing the change in the information gain. Typically, there will be a high information gain when there is a change of requirement/topic in the conversation system. According to one or more embodiments, the output of Code2Vec model (see also 504, FIGS. 5 and 603, FIG. 6) is analyzed to identify the set of modules/code snippets 903, which are mapped to portions of the client's sub-requirement. According to an embodiment of the present invention, the method generates a set of hyperlinks (or other traceable artifact) mapping the conversation block with the code snippet. The hyperlinks are traceable evidence enabling an automated augmentation 904 feature, for example, within a software development environment of the main code, where the hyperlinks are selectable by a developer to retrieve a portion of the main code (e.g., a code snippet of the main code) needed (e.g., to be modified, augmented, and/or superseded through the use of custom code) to deploy a new microservice described by the client requirement.

According to some embodiments, the client is educated about the main code via conversations (e.g., 602) on various attributes involved in the modules (e.g., modules to be edited or replaced by intercepting code) to resolve disambiguates across scope, range, do's and don'ts of attributes where initial discovery happens based on correlating test-case and code documentations. According to at least one embodiment, if test-case and code documentation correlation doesn't resolve disambiguate, automated message/email is sent to the client code developer via the same conversation engine for further consideration and resolution. According to some embodiments, the bootstrapping of attribute confusion disambiguation via correlating inference from test-case and documentations is improved over time via runtime messaging support with client code developers for non-resolved queries. Further, according to one or more embodiments, the client is provided with new tools (e.g., see FIGS. 8-9) for improved software development.

Recapitulation:

According to one or more embodiments of the present invention, a method of operating an artificial intelligence chat-bot includes providing a server executing computer code embodying the chat-bot (401), receiving, via the server, a requirement for customization of a main computer code (402), wherein the main computer code comprises a plurality of modules, and determining, by the chat-bot, top-k modules of the main computer code potentially affected given the requirement for customization (403). The determination of the top-k modules includes representing each of the modules of the main computer code in an embedding vector space (404), representing the requirement for customization as a vector in the embedding space (405), and fetching the top-k modules nearest the requirement for customization in the embedding space (406). The method further includes applying an entropy analysis across the top-k modules to determine a distinguishing next question (407), communicating the distinguishing next question to an entity providing the requirement for customization (408), receiving a response to the distinguishing next question (409), and filtering the top-k modules using the response to determine a set of the modules associated with the requirement for customization (410).

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for operating an artificial intelligence chat-bot. Further, a computer program product can include a tangible computer-readable recordable storage medium with code adapted to be executed to carry out one or more method steps described herein, including the provision of the system with the distinct software modules.

Figure 10:
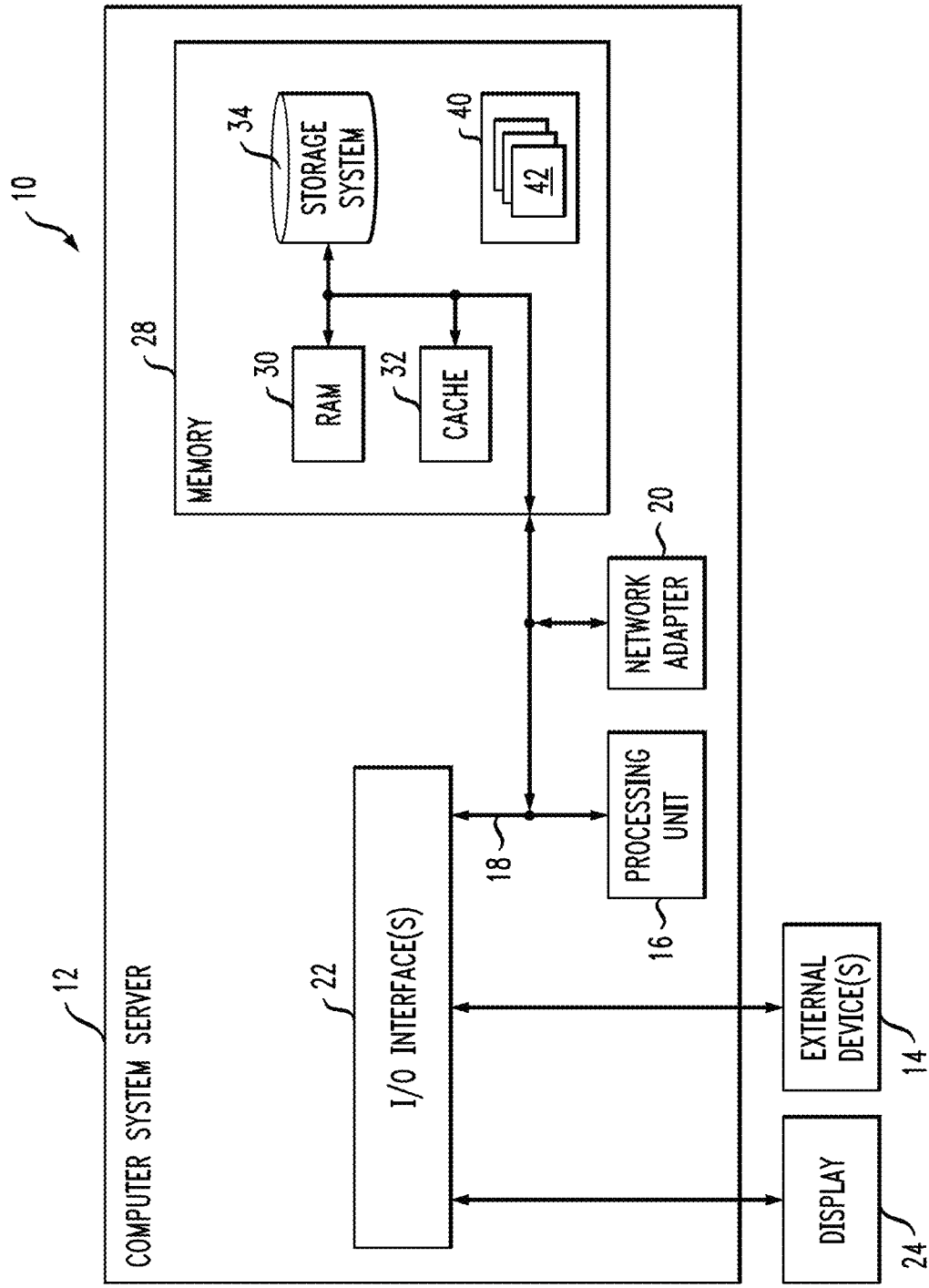
FIG. 10 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating an artificial intelligence chat-bot, the method comprising:
    providing a server executing computer code embodying the chat-bot;
    receiving, via the server, a requirement for customization of a main computer code, wherein the main computer code comprises a plurality of modules;
    determining, by the chat-bot, top-k modules of the plurality of modules of the main computer code potentially affected given the requirement for customization, wherein the determination of the top-k modules comprises:
        representing each module of the plurality of modules of the main computer code in an embedding vector space;
        representing the requirement for customization as a vector in the embedding space; and
        fetching the top-k modules nearest the requirement for customization in the embedding space;
    applying an entropy analysis across the top-k modules to determine a distinguishing next question;
    communicating the distinguishing next question to an entity providing the requirement for customization;
    receiving a response to the distinguishing next question; and
    filtering the top-k modules using the response to determine a set of the plurality of modules associated with the requirement for customization.

2. The method of claim 1, wherein the embedding space is formed using code comments contained in the plurality of modules.

3. The method of claim 2, wherein the distinguishing next question is configured to request an information item resolving a conflict in the code comments.

4. The method of claim 1, further comprising:
    performing, given the requirement for customization and a log comprising the distinguishing next question and the response, an entropy analysis of code documentation associated with the main computer code to determine a plurality of attributes; and
    enriching the code documentation using the attributes.

5. The method of claim 1, further comprising:
    performing, given the requirement for customization and a log comprising the distinguishing next question and the response, an entropy analysis of code documentation associated with the main computer code to determine a plurality of attributes;
    determining at least one ambiguity in the code documentation; and
    outputting a communication including an indication of the at least ambiguity.

6. The method of claim 1, further comprising:
    extracting first topics from code comments contained in the module using natural language processing;
    extracting second topics from the requirement for customization using natural language processing; and
    generating a set of features by combing the first topics and the second comments, which describes a potential modification of the main code enabling requirement for customization.

7. The method of claim 1, given the requirement for customization and a log comprising the distinguishing next question and the response, further comprising:
    mapping a conversation block of the log to a portion of the requirement for customization;
    identifying a code snippet of at least one module of the plurality of modules of the main code, the code snippet corresponding to the portion of requirement for customization; and
    generating a set of hyperlinks mapping the conversation block with the code snippet.

8. A non-transitory computer readable storage medium comprising computer executable instructions which when executed by a computer cause the computer to perform a method of operating an artificial intelligence chat-bot, the method comprising:
    providing a server executing the computer executable instructions embodying the chat-bot;
    receiving, via the server, a requirement for customization of a main computer code, wherein the main computer code comprises a plurality of modules;
    determining, by the chat-bot, top-k modules of the plurality of modules of the main computer code potentially affected given the requirement for customization, wherein the determination of the top-k modules comprises:
        representing each module of the plurality of modules of the main computer code in an embedding vector space;
        representing the requirement for customization as a vector in the embedding space; and
        fetching the top-k modules nearest the requirement for customization in the embedding space;
    applying an entropy analysis across the top-k modules to determine a distinguishing next question;
    communicating the distinguishing next question to an entity providing the requirement for customization;
    receiving a response to the distinguishing next question; and
    filtering the top-k modules using the response to determine a set of the plurality of modules associated with the requirement for customization.

9. The non-transitory computer readable storage medium of claim 8, wherein the embedding space is formed using code comments contained in the plurality of modules.

10. The non-transitory computer readable storage medium of claim 9, wherein the distinguishing next question is configured to request an information item resolving a conflict in the code comments.

11. The non-transitory computer readable storage medium of claim 8, further comprising:
    performing, given the requirement for customization and a log comprising the distinguishing next question and the response, an entropy analysis of code documentation associated with the main computer code to determine a plurality of attributes; and
    enriching the code documentation using the attributes.

12. The non-transitory computer readable storage medium of claim 8, further comprising:
   performing, given the requirement for customization and a log comprising the distinguishing next question and the response, an entropy analysis of code documentation associated with the main computer code to determine a plurality of attributes;
   determining at least one ambiguity in the code documentation; and
   outputting a communication including an indication of the at least ambiguity.

13. The non-transitory computer readable storage medium of claim 8, further comprising:
   extracting first topics from code comments contained in the module using natural language processing;
   extracting second topics from the requirement for customization using natural language processing; and
   generating a set of features by combing the first topics and the second comments, which describes a potential modification of the main code enabling the requirement for customization.

14. The non-transitory computer readable storage medium of claim 13, given the requirement for customization and a log comprising the distinguishing next question and the response, further comprising:
   mapping a conversation block of the log to a portion of the requirement for customization;
   identifying a code snippet of at least one module of the plurality of modules of the main code, the code snippet corresponding to the portion of the requirement for customization; and
   generating a set of hyperlinks mapping the conversation block with the code snippet.

* * * * *